United States Patent

Swearingen

[15] 3,693,160

[45] Sept. 19, 1972

[54] APPARATUS FOR CONTROLLING THE CYCLE STEALS REQUIRED BY A CHAIN PRINTER UNDER CPU CONTROL

[72] Inventor: Kent W. Swearingen, Rochester, Minn.

[73] Assignee: International Business Machines Corporation

[22] Filed: June 26, 1970

[21] Appl. No.: 50,271

[52] U.S. Cl. ........................................ 340/172.5
[51] Int. Cl. ........................ G05b 15/02, G06c 11/06
[58] Field of Search ................................ 340/172.5

[56] References Cited

UNITED STATES PATENTS

| | | | |
|---|---|---|---|
| 3,323,110 | 5/1967 | Oliari et al. | 340/172.5 |
| 3,453,600 | 7/1969 | Stufford et al. | 340/172.5 |
| 3,500,466 | 3/1970 | Carleton | 340/172.5 |

*Primary Examiner*—Paul J. Henon
*Assistant Examiner*—Paul R. Woods
*Attorney*—Sughrue, Rothwell, Mion, Zinn & Macpeak

[57] ABSTRACT

A printer attachment, which provides an interface between a CPU and a chain printer, contains a means which requests either one, two, or three cycle steals each time a character on the character chain is in line with an optioned print position, depending upon the correspondence between the chain character and the character to be printed. If the data to be contained in a print position is a blank, then only one cycle steal is required before another print position is optioned. After a character has been printed in a particular print position, only one cycle steal is then required each time that this print position is again optioned during the printing of a line.

7 Claims, 6 Drawing Figures

INVENTOR
KENT W. SWEARINGEN
BY Sughrue, Rothwell, Mion, Zinn & Macpeak
ATTORNEYS FIG. 3a CYCLE STEAL CONTROL

| PC 1 | | PC 2 | | PC 3 | |
|---|---|---|---|---|---|
| FF 1 | FF 2 | FF 1 | FF 2 | FF 1 | FF 2 |
| 1 | 0 | 1 | 1 | 0 | 1 |

LOGIC STATES OF SET SIDE OF FF1 AND FF2 DURING EACH CYCLE STEAL

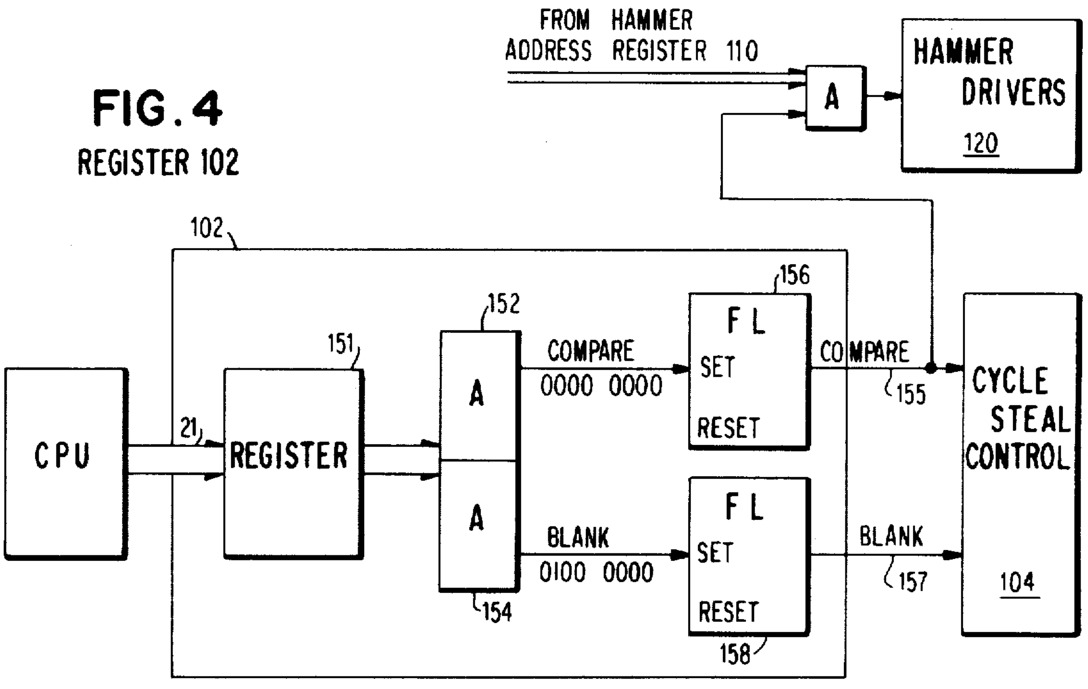
FIG. 4
REGISTER 102
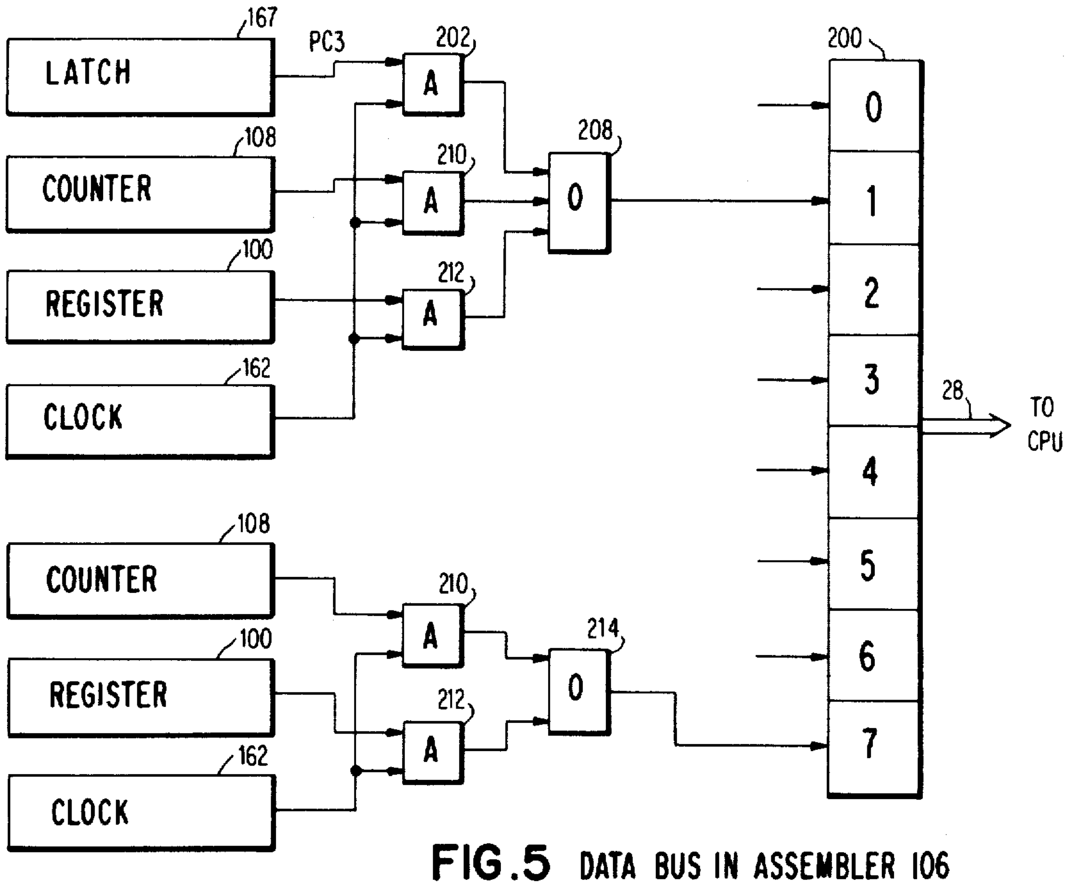
FIG. 5 DATA BUS IN ASSEMBLER 106

APPARATUS FOR CONTROLLING THE CYCLE STEALS REQUIRED BY A CHAIN PRINTER UNDER CPU CONTROL

BACKGROUND OF THE INVENTION

1. Field of the Invention

The invention is in the field of printer attachments and specifically in the field of means for requesting cycle steals from a CPU.

2. Description of the Prior Art

Chain printers and their operation are well known in the art. A description of such a printer which may be used in this invention is contained in the patent to Cunningham, U.S. Pat. No. 3,241,480, issued Mar. 22, 1966. As is well known, such printers may operate under the control of a CPU with logic and control means providing an interface between the CPU and the chain printer. This logic and control means is designated the printer attachment. During the process of exchanging information, the printer and the CPU operate together. Information transfer takes place between CPU cycles on a priority basis with other devices. By means of a fixed cycle steal priority, input/output cycles may be interleaved between any two CPU cycles to fetch or store data to and from the attachment.

Print cycle steals are defined as the input/output cycles for a printer attachment. Each print cycle steal is an individually requested input/output cycle. During the input/output cycle, normal CPU processing is suspended and the attachment controls the CPU registers, main storage, and arithmetic logic unit.

In chain printers under CPU control the information to be printed at each print position is stored in a line-by-line sequence in a storage means. In addition, a second storage means stores an image of the chain characters contained in the printer. To determine if a print hammer aligned with a print position is to be fired when a character becomes aligned with the print position, the data to be printed in the print position being optioned, i.e., the print position selected for printing, is compared with the character aligned therewith. In actuality, the data stored in the first storage is compared with the image of the aligned chain character to determine whether or not printing should occur. Since all the characters on the chain become aligned with each print position, each print position is optioned many times during the printing of a line. If the character to be printed is the same as the character aligned with the print position, a compare is said to exist and the hammer is triggered.

Such prior systems require two cycle steals to option each print position. That is, two CPU cycles are required every time a new character is moved into a print position to determine if that character is to be printed. One cycle is used to read out the data to be printed and the other to read out the chain character image in alignment with the print position and compare it with the data to be printed.

By reducing the average number of cycle steals necessary to print a line, additional CPU I/o cycles are available for other uses. Thus, a means to reduce the number of cycle steals would prove an important advantage over prior CPU controlled chain printers. It is such a means which is the object of this invention.

SUMMARY OF THE INVENTION

THe invention relates to means for reducing the average number of cycle steals necessary to print a line of data. In brief, when optioning a print position, a first cycle steal is used to retrieve the data, corresponding to the character to be printed in the optioned print position. If the data represents a character, that is, not a blank, then an additional cycle steal is requested to retrieve the chain character image presently aligned with the optioned print position. However, if the addressed storage location stores a blank, then no more cycle steals are requested and another print position is optioned.

If the data retrieved during the first cycle steal represents a character, the data is stored temporarily in a portion of the attachment. During the second cycle steal, the image of the chain character aligned with the otpioned print position is read out from the storage means while the character read out during the first cycle steal is returned to the CPU. A comparison is made between this character and the chain character image. If a match exists, a hammer control means, not a part of this invention, is latched up, ready to be fired on the occurrence of a hammer firing pulse.

If the addressed chain character image and the character to be printed at the optioned print position do not compare, then no additional cycle steals are requested for this print position and another print position is optioned. However, if a compare did occur, then a third cycle steal is requested. During this cycle, the location in the main storage which contains the character just printed is again addressed and the character therein erased and replaced by a blank. Since a blank now appears in this storage location, each time the print position corresponding thereto is again optioned during the printing of a line, as it will be each time a new character is aligned therewith, only one cycle steal is necessary to determine that the character aligned with this print position is not to be printed. Thus, on the average, the number of cycle steals needed to print a print position on a line is considerably less than two.

It becomes even more apparent that with the use of this invention the average number of cycle steals required to print a line is reduced below that required by prior devices, when it is realized that generally not every print position on a line is going to be printed. For those print positions which will remain blank, only one cycle steal is necessary each time they are optioned as opposed to the prior means which require a full two print cycle steals even though the optioned print position remains blank.

The invention will become more apparent with the detailed description of the preferred embodiment of the invention set forth below.

BRIEF DESCRIPTION OF THE DRAWINGS

FIG. 3*a* is a logic diagram of the cycle steal control means of this invention;

FIG. 4 is a logic diagram of the decoder unit of this invention; and

FIG. 5 is a logic diagram of the "data bus in" assembler of this invention.

DETAILED DESCRIPTION OF THE PREFERRED EMBODIMENT

As disclosed previously, the invention pertains to means for controlling the number of cycle steals regulated by a printer attachment. Chain printers which can be used with this invention are well known in the art. As disclosed above, one such chain printer is described in the patent to Cunningham. Generally, in chain printers, the distances between the print positions and those between the characters on the chain are not equal. It is with such a printer that the detailed description of the invention will be given.

For the purposes of illustration only, the printer will be taken as having a print span of 0.10 inches and a character span of 0.1505 inches. The relationship between the character span and the print span is shown diagrammatically in FIG. 1. It is noted, however, that the particular dimensions for the character span and the print span are given for the purposes of illustration only and that the invention, as described below is operable in the manner to be described regardless of the dimensional relationship between the print span and the character span. As is known, the reason for having the character span greater than the print spaN is two-fold. First, because of the sequential alignment, simultaneous printing in adjacent positions is avoided. Second, sufficient time is made available to compare the character to be printed with the character on the chain aligned with the print position so as to determine whether or not a hammer should be fired.

Figure 1:
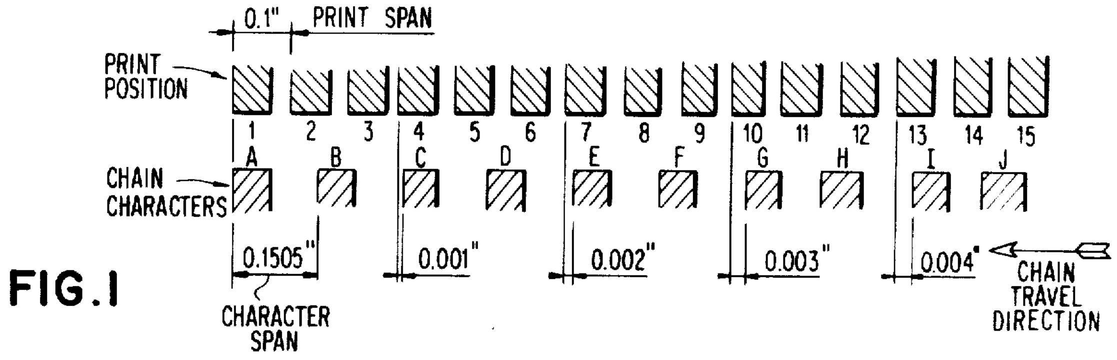
FIG. 1 shows the dimensional relationship between the print span and character span of a chain printer which may be used with the invention.

Assuming one hammer for each print position, with the print span to character span arrangement as shown in FIG. 1, print position 1 is the first to be optioned. Thereafter, print position 4 will be optioned and then print position 7, etc. Since, with any printer, the relationship between the print span and the character span, as well as the speed of the chain, is known, it becomes a simple matter to determine the sequence in which the print positions become aligned with chain characters.

After every third print position has been optioned across the line, the scanning returns to print position 2 which, at this time, is aligned with the chain character B.

The above process is repeated with every third print position being optioned, that is, after print position 2 is optioned, optioning of the print positions follows the order 5, 8, 11, etc. until the end of the line is reached. After the line has been scanned, beginning at print position 2, scanning returns to print position 3 where, at this time, the chain character designated C is in line with print position 3. Again, every third character on the line is optioned. Scanning now returns to print position 1 where, by this time, the character B has moved in line with this print position. Thus, the technique of scanning each print position with every character on the character chain becomes evident. It is again pointed out that a chain printer using the print span to character span relationship just described is known in the art and has been used for illustration purposes only. It will become obvious to those with ordinary skill in the art that the apparatus for controlling the cycle steals is equally applicable to chain printers with different print span to character span relationships.

Figure 2:
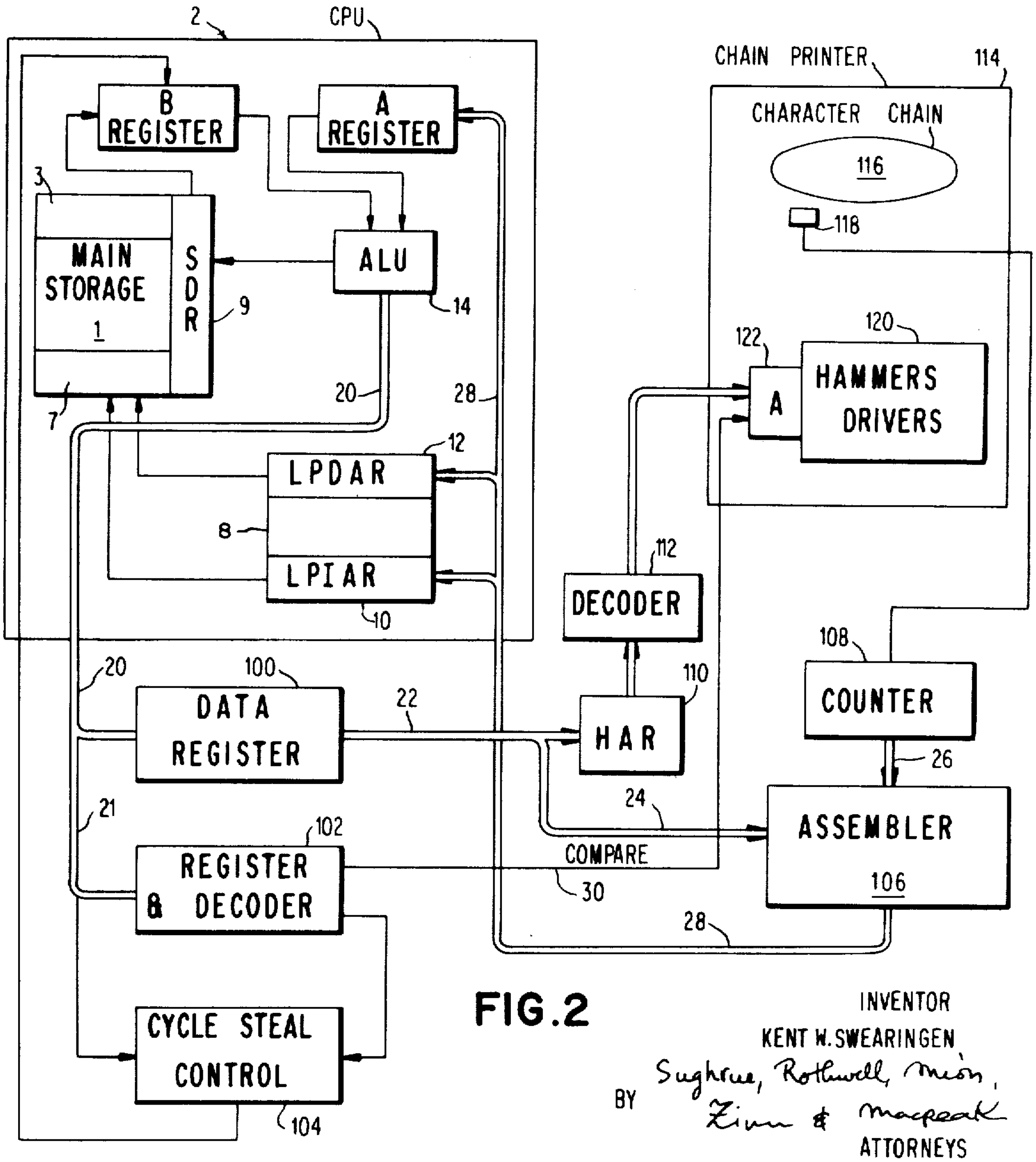
FIG. 2 is a simplified diagram of a CPU controlled chain printer utilizing the invention.

FIG. 2 shows the relationship between a CPU, 2, a chain printer 114 and a printer attachment which provides an interface between the CPU and the chain printer. The CPU 2 is shown generally by block diagrams with only those components necessary to carry out the teachings of this invention included in the diagram. CPUs which may be used with this invention are well known in the art and thus a complete description of their operation is not necessary for an understanding of this invention. An example of the CPU which may be used with this invention is the commercially available IBM System 3 central processing unit.

However, in order to fully describe the invention, those portions of the CPU used in conjunction with the cycle steal control means of this invention will be described. The main storage 1 includes storage location 3 containing a line of data to be printed as well as a storage location 7 containing an image of the chain of characters 116. Readout of an address location in the main storage 1 is accomplished through a storage data register 9, as is well known in the art. Storage area 3 is addressed by means of a line printer data address register 12 which may be contained in local store register 8. As will be described below, register B stores the image of the character addressed by the line printer image address register 10. Register 10 may also be contained in the local store register 8. Register A, as will also be disclosed below, stores the data to be printed at on optioned print position. Arithmetic logic unit 14 compares the characters stored in register A and B. The result of the comparison is transferred under the control of the CPU, via buses 20 and 21, to the register-decoder combination 102. If a compare exists, line 30 is activated, thereby enabling AND gate 122 allowing for the passage of the signals from the decoder 112 to the hammer drivers 120.

A chain printer is shown generally at 114. Shown diagrammatically within 114 is a character chain 116, a chain emitter 118, and the hammer drivers 120. These elements are also well known in the art and a detailed description of their operation is similarly not needed for an understanding of the invention. However, where these elements are used with the elements of the invention, a description of their operation in conjunction with the operation of the elements of the invention will be included.

The printer attachment is shown to include a data register 100 coupled through a bus 20 to the CPU. The output of the register 100 is coupled through bus 22 to a hammer address register 110, the output of which is fed through decoder 112 to the hammer drivers 120. Also coupled to the CPU through buses 20 and 21, is a register-decoder combination 102. As will be explained, if a compare exists between the character to be printed at an optioned print location and the chain character which is aligned with that print position, the compare line 30 is raised, thus enabling AND gate 122. This allows the data stored in register 100 to be passed through the register 110 and decoder 112 to the hammer drivers 120 thereby activating the selected hammer.

The attachment also contains a cycle steal control means 104 which controls the number of cycle steals requested from the CPU each time a character is aligned with an optioned print position.

Counter 108 may be used to determine which chain character is in line with any of the optioned print positions at any point in time. Though the counter 108 is known in the art, a brief description of its operation will be described in order to give a better understanding of the operation of the attachment in relation to the chain printer and the CPU. As has been previously explained, a chain character will be printed on a print position only after the character is compared with the character to be printed at the print position. Thus, prior to any printing operation, a comparison must be made between the character aligned with the optioned print position and the data to be printed therein. It becomes obvious then, that at any point in time, it is necessary to know what character is before the optioned print position. A chain pulse emitter 118 generates pulses each time a character passes its location. This emitter can be any known means and may be any mechanically, optically, or capacitively activated pulse emitter responsive to the passing of chain characters. Counter 108 counts the number of pulses emitted from emitter 118. Assuming that emitter 118 is positioned before print position 1 and that counter 108 begins its count as an arbitrarily designated chain character labeled 1 passes the emitter, the character positioned before any of the print positions can be easily determined simply by incrementing the counter 108 to the print position being optioned. Thus, for example, if a character designated 7 is before print position 1, and if print position 4 is being optioned, using the print span to character span relationship shown in FIG. 1, then immediately it can be determined that the character designated 9 on the chain is the one before print position 4.

When it is desired to carry out a compare operation, the value of the counts stored in counter 108 is transferred through an assembler 106, to be described fully below, to the line printer image address register 10 contained in the CPU. This register addresses the storage area 7 of the main storage 1 to retrieve the image of that character which is presently aligned with the print position being optioned.

To more fully disclose the invention, the following examples, which go through the optioning of print positions 1, 4, and 7 of FIG. 1, are included. Detail descriptions of the apparatus necessary to carry out the invention are included within these examples.

To print a line corresponding to the data stored in the storage area 3 of the main storage 1, register 12 is initially preloaded with the address in the storage register corresponding to the first print position to be optioned. The data stored in area 3 corresponds, character to character, to the print line shown in FIG. 1 beginning at print position 1. The print positions are optioned sequentially so that the address locations to be stored in register 12 will, in the case of the print span to character span relationship shown in FIG. 1, follow the pattern 1, 4, 7, 10, etc. to the end of the line. Thereafter, the storage location in area 3 corresponding to print position 2 will be addressed, then 5, 8, 11, etc. This process continues again until the end of the line is reached. Thereafter, the storage location in area 3 corresponding to print position 3 will be addressed, then 6, 9, 12, etc. This process continues again until the end of the line is reached. By this time, the character B shown in FIG. 1 on the character chain, is aligned with print position 1. Again, print position 1 is optioned then 4, 7, 10, etc. until the end of the line is reached. The entire process continues until each print position has been aligned with every character on the chain.

With reference to FIG. 3, upon the occurrence of a print command, the set side of latch 180 rises to a logic 1 which, in a manner known in the art requests a cycle steal from the CPU.

The print command pulses are derived from the chain emitter and consist of a plurality of clock pulses spaced in accordance with the time between the alignment of two successive print positions with a character on the character chain. Thus, with reference to FIG. 1, when character A is aligned with print position 1 the chain emitter produces a pulse which initiates a train of clock pulses from a source (not shown). The clock pulses are so timed that a second clock pulse occurs when character C is aligned with print position 4. In this manner, a print command pulse is initiated each time a character is aligned with an optioned print position.

Figure 3B:
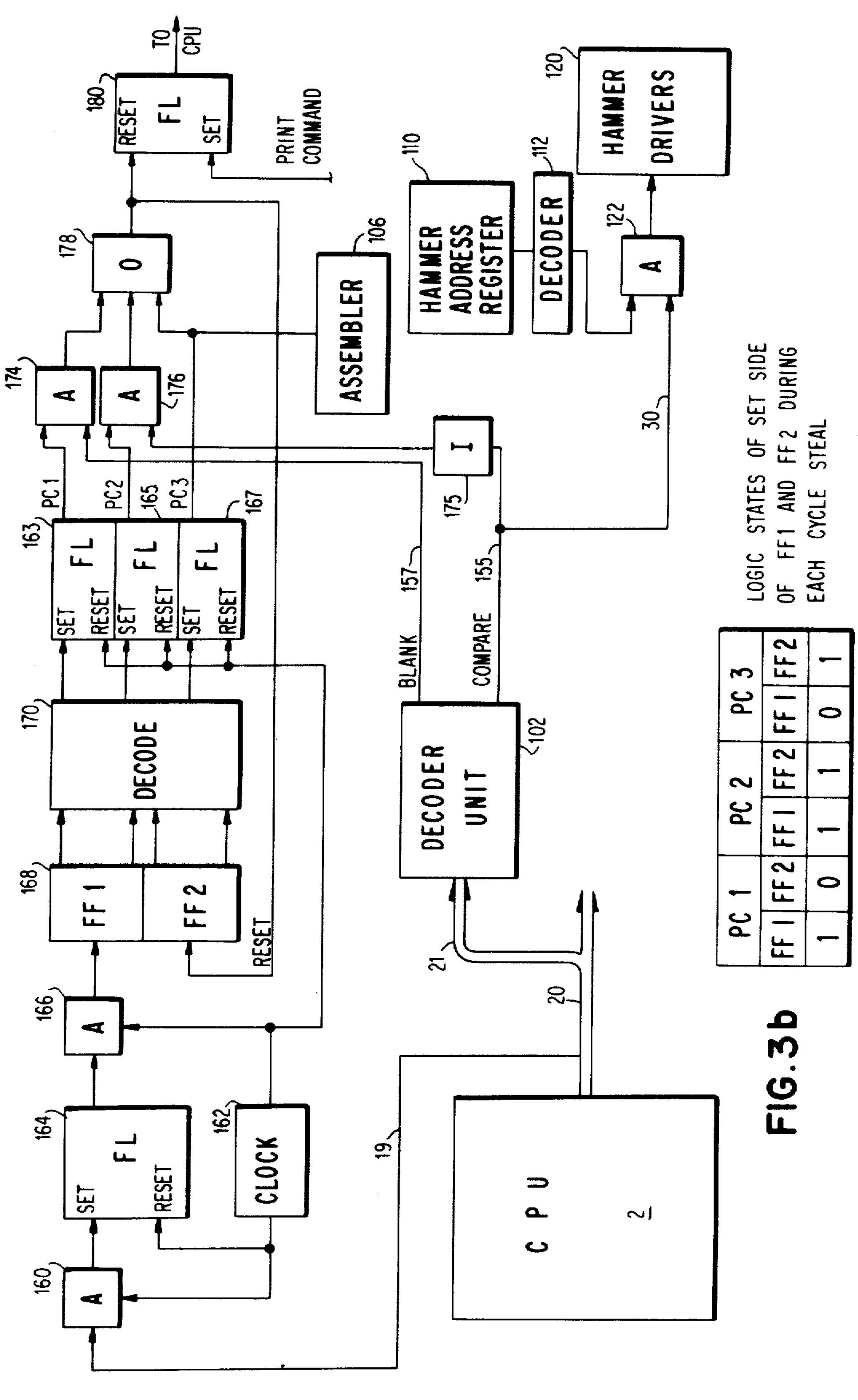
FIG. 3*b* is a chart of the conditions of the cycle steal counter during the counting of three cycle steals.

The CPU will recognize that a cycle steal has been requested and at some time in the future assigns to the printer attachment a CPU input/output cycle steal. The time is so fast that the character will not appreciably move between time of the print command pulse and the assignment of the I/o cycle. The granting of a cycle steal causes line 19 to be activated, thereby enabling AND gate 160. Upon the occurrence of a clock pulse from clock 162, the set side of latch 164 rises to a logic 1 which, through AND gate 166, sets counter 168 to the condition indicative of print cycle steal 1. FIG. 3b indicates the state of counter 168 after the granting of a first cycle steal.

Latch 164 as well as latches 163, 165 and 167, to be described, are latches known as polarity holds, or figure-eight latches. With this type of latch a set pulse overrides the reset. Such latches are well known in the art. However, in order to more clearly define the operation of the invention a brief description of the operation of such a latch is included. With reference to latch 164, when there exists a coincidence between a clock pulse from clock 162 and a cycle steal both the set and reset terminals of the latch are enabled. The output however follows the set side since the set overrides the reset. When the clock pulse disintegrates the latch remains with its set side at a logic 1. On the occurrence of the next clock pulse, without a cycle steal, the latch is reset, setting the set side to a logic 0.

Since, when optioning a print position, it is not known in advance whether one, two, or three cycle steals will be required, counter 168 counts the number of cycle steals requested for each print position optioned. A decoder 170 decodes the count in 168 and applies the results to three latches 163, 165 and 167.

After latch 163 is set, a decision is made as to whether or not to request a second cycle steal. As has been described previously, a second cycle steal will be requested only if the data stored in the storage location of the main storage 1, corresponding to the print position 1, is other than a blank. For the purposes of illustration, the blank will be defined as an 8-bit byte, 01000000. During the first cycle steal, the data corresponding to the data to be printed at the print position optioned is retrieved and stored in data register 100 shown in FIG. 2. Simultaneously, the same data is applied to register-decoder unit 102. The unit 102 is shown in detail in FIG. 4 and consists of a register 151, decoders 152 and 154 and latches 156 and 158. Latches 156 and 158 are also polarity holds or figure eight latches. Operation of such latches has been described above. Resetting of this latch occurs when the next 8-bit byte is transferred into register 151. The clock pulse which effects the transfer is applied to the reset terminals of these latches thereby effecting a reset. Decoder 152 comprises a series of AND gates which decodes the eight bit byte corresponding to the data to be printed at the optioned print position and supplies an output to latch 156 only if the byte contains all zeros. Decoder 154 also contains a plurality of AND gates which supply an output to latch 158 only if it detects an input corresponding to a blank, that is, an 8-bit byte in the form, 01000000. Let it be assumed that in the storage location in area 3 of the main storage 1, corresponding to print position 1, there is stored the data corresponding to a blank. In such a case, there would be no use in comparing the character on the chain with this blank character. Therefore, there is no need to take a second cycle steal and retrieve the chain character image byte from area 7 in main storage 1. Thus, when a blank is detected by decoder 154 the set side of latch 158 rises to a logic 1. Since AND gate 174 of FIG. 3 has been enabled by the setting of latch 163, the setting of latch 158 causes the set side of latch 180 to go to a logic 0 and simultaneously resets counter 168 to indicate a count of zero.

Print position 1 has now been optioned for the first time. The next print position in line with a character on the character chain 116 is print position 4. Print position 4 is now optioned to determine whether or not the chain character aligned therewith corresponds to the character to be printed at that print position. Again, a print command sets the set side latch 180 to a logic 1 to request a cycle steal. When the cycle steal is granted, it will be indicated by the setting of latch 164 which, in coincidence with a clock pulse from clock 162, sets counter 168 to the state indicative of a first cycle steal, PC1. As before, decoder 170 decodes the count contained in counter 168 and sets the proper latch. In this case latch 163 is again set. During this first cycle steal, the data stored in the main storage, corresponding to that which is to be printed at print position 4 is retrieved. This data is loaded into data registers 100 and 151 and decoded in decoder 102 to determine whether or not the data represents a blank. Let it be assumed that this data is not a blank, that is, it is valid data. In this instance, the set side of latch 158 is at a logic 0 and line 157 remains low. Under such conditions, latch 180 is not reset. Thus, the request for a cycle steal remains and, upon the granting of the next cycle steal, during a sampling time indicated by clock 162, the set side of latch 164 is again set to a logic 1. The set condition of latch 164 in coincidence with a clock pulse, advances counter 168 to the condition shown in FIG. 3*b*, corresponding to the second cycle steal, PC2. This condition is decoded in decoder 170 Using the count contained in counter 108 as previously explained, during PC2, the image character corresponding to the chain character which is aligned with print position 4 is addressed by line printer image address register 10 and fed through storage data register 9 to register B in the CPU. During this same time, the data, which has been stored in register 100 of the printer attachment, is fed through the data bus input assembler 106 back to the CPU and specifically to register A. The arithmetic logic unit 14 of the CPU then subtracts the contents of register B from the contents of register A and applies the results thereof to the register-decoder unit 102. With reference to FIG. 4, decoder 152 determines whether or not a compare has been accomplished, i.e., whether or not the 8-bit byte is 00000000. If such is the case, then the set side of latch 156 is set to a logic 1 activating line 155. If the contents of register B and the data register A did not compare, then line 155 is not activated. If the data in the register B is not equivalent to the data in the register A then the output of the set side of latch 156 applied to gate 176 through inverter 175 causes a logic 1 at the output of OR gate 178 resetting latch 180 and counter 168. Thus, no additional cycle steals will be requested for this particular print position during this optioning period.

The next print position which will have a character aligned therewith is print position 7. Thus, it is this print position which will next be optioned. Upon the occurrence of the print command, latch 180 is set, thereby requesting a cycle steal. Upon the granting of the cycle steal by the CPU, latch 164 is set as described above again setting counter 168 to the condition corresponding to the first cycle steal, that is, PC1. As before decoder 170 decodes this condition and sets latch 163 enabling gate 174. During this first cycle steal, the data in storage area 3 corresponding to the data to be printed at print position 7, is read out and stored in data register 100. Assuming that the data is not a blank, i.e., it is valid data, latch 180 remains high and a second print cycle steal is requested. Upon the granting of the second print cycle steal, counter 168 is advanced to a condition corresponding to the PC2 condition. Again, decoder 170 decodes this condition and sets latch 165 the setting of latch 165 enabling AND gate 176. As described above, during the second cycle steal, decoder unit 102 compares the data stored in the B register with that stored in register A and if a compare occurs, latch 156 is set.

Let is now be assumed that such a compare does occur when optioning print position 7. That is, let it be assumed that the data to be printed at print position 7 corresponds to the chain character aligned with this print position. In such a situation, latch 156 is set, activating line 155. Again, with reference to FIG. 3*a*, activation of line 155 through inverter 175 causes AND gate 176 to remain disabled. Under these conditions, latch 180 and counter 168 remains set. Thus, a request exists for an additional cycle steal. Upon the granting of the third cycle steal, latch 164 is again set and counter 168 is advanced to indicate the third cycle steal, PC3. As before, decoder 170 decodes the condition of counter 168 and on detecting a count indicative of PC3, sets latch 167. In this manner, line PC3 is activated which causes latch 180 to be reset while simultaneously resetting counter 168.

Returning to the operation of the attachment, during the second cycle steal, the existence of a compare activates line 30 to enable gate 122 which in turn allows the activation of hammer drivers 120.

The only purpose of the third print cycle steal PC3 is to write a blank character in place of the data character which has just been retrieved and stored in register 100 during the first cycle steal. Since, on the optioning of print position 7, a compare has occurred, a character has been printed in this pring position. In that the character has been printed, there is no further use for the data character in the main storage. Therefore, a blank will be written in place of that data in storage area 3 of main storage 1.

Generation of the blank character occurs in the assembler 106 under the control of the PC3 signal. An assembler which may be used with this invention is shown in detail in FIG. 5. It consists of eight latches, one for each bit of the 8-bit code stored in register 100. Each bit position contains an input through AND gates 210 and 212 and OR gate 214. However, for simplicity, FIG. 5 shows the inputs to bit positions 1 and 7 only. One input to AND gate 210 is supplied from counter 108, the other from clock 162. One input to AND gate 212 is supplied from data register 100, the other from clock 162. In this manner, the data contained in counter 108 and register 100 is supplied to the CPU. In addition to the two AND gates 210 and 212, the input circuitry to the latch representative of bit position 1 contains a third AND gate 202, one input of which is coupled to line PC3 which is in turn coupled to the set side of latch 167. In this manner, upon the occurrence of the third cycle steal, gate 202 is enabled which sets bit position 1 of latches 200 to a logic 1. All other latches remain at the logic 0, thus producing the blank byte, 01000000. This byte is applied through bus 28 to the storage location in storage area 3 corresponding to the print position just printed. In this manner, the blank is written into this storage location.

Since, one the occurrence of the third cycle steal, latch 180 has been reset, the next print position may be optioned. In the case of the specific printer described herein, that print position would be print position 10. Optioning of this print position follows identically the method used for optioning print positions 1, 4, and 7 previously described.

It is important to note, however, that the next time, and each additional time, that print position 7 is optioned, only cycle steal is required to determine that no printing is to occur at this print position.

While the invention has been particularly shown and described with reference to a preferred embodiment thereof, it will be understood by those skilled in the art that various changes in form and detail may be made therein without departing from the spirit and scope of the invention.

What is claimed is:

1. In a printer attachment providing an interface between a central processing unit and a chain printer, said central processing unit controlling the transfer of data to and from a memory means storing replicas of a character to be printed at each print position of said chain printer including blank characters, as well as an image of the chain of characters which move past the print positions, printer operation being under the control of the central processing unit by way of cycle steals produced in response to attachment produced cycle steal requests, the improvement comprising:

means responsive to a first cycle steal for producing a signal indicative of a blank character when a blank character corresponds to the character to be printed at an optioned print position, and means responsive to said blank character signal for terminating the cycle steal requests until another print position is optioned.

2. The printer attachment of claim 1 wherein said central processing unit compares the chain character before an optioned print position with the actual character to be printed at that position, further comprising;

means for storing signals indicative of the results of the comparison made by the central processing unit, means responsive to the contents of said signal storing means for producing a signal designating correspondence between the chain character before the optioned print position and the character to be printed at that position, and means, responsive to the absence of said correspondence signal for terminating said cycle steal requests until another print position is optioned.

3. The printer attachment of claim for requesting a further cycle steal and for causing a blank character to be written into means, responsive to said correspondence signal for written into the memory means at the location storing the replica of the character which is to be printed at the optioned print position.

4. In a computer controlled printer system including a chain printer of the type having a chain of characters in continued movement past a series of print positions and a central processing unit having access to a memory means storing replicas of the characters to be printed at each print position as well as an image of said chain of characters, said central processing unit causing the retrieval of the characters to be printed at each print position as each of said positions is optioned for printing, the improvement comprising a printer attachment including;

means for determining the chain character aligned with the optioned print position, means for determining if the retrieved character corresponds to a blank character, and means responsive to said determining means for causing said central processing unit to compare the retrieved character with said chain character only if the retrieved character is not a blank.

5. The printer attachment as claimed in claim 4 further comprising:

means for producing a signal indicative of a correspondence between said chain character and the the character to be printed at the optioned print position, and means responsive to said correspondence signal for causing said central processing unit to replace said retrieved character in said memory means with a blank.

6. In a printer attachment providing an interface between a chain printer which includes a moving chain of characters, and a central processing unit, said attachment presenting cycle steal requests to said central processing unit, said central processing unit granting cycle steals to said printer to permit the interchange of information therebetween;

a data register for storing the character to be printed at an optioned print position, first decoder means, coupled to said data register, for producing a blank signal when the contents of said data register corresponds to a blank character, second decoder means coupled to said data register for producing a correspondence signal when the chain character aligned with said optioned print position corresponds to the character to be printed, and cycle steal control means responsive to said blank and correspondence signals for controlling the number of cycle steal requests produced by said attachment for each optioned print position.

7. The printer attachment of claim 6 wherein said cycle steal control means comprises:

first latch means for requesting cycle steals, second latch means for indicating the granting of a cycle steal by the central processing unit, counter means coupled to said second latch means for counting the number of cycle steals granted, third decoder means for generating signals indicative of the state of said counter means, first gate means, responsive to said first decoder means and said third decoder means for resetting said first latch means and said counter after a first cycle steal has been granted upon the occurrence of a blank signal, and second gate means, responsive to said second decoder and said third decoder for resetting said first latch means and said counter after a second cycle steal when the character to be printed at an optioned print position does not correspond to the chain character aligned with that print position.

* * * * *

PO-1050 (5/69)

UNITED STATES PATENT OFFICE
CERTIFICATE OF CORRECTION

Patent No. 3,693,160 Dated September 19, 1972

Inventor(s) Kent W. Swearingen

It is certified that error appears in the above-identified patent and that said Letters Patent are hereby corrected as shown below:

In the specification, column 2, line 1, "THe" first occurrence should read --The--. Column 8, line 49 "is" should read --it--. Column 10, line 24, re-write claim 3 to read as follows:

3. The printer attachment of claim 2 further comprising, means, responsive to said correspondence signal for requesting a further cycle steal and for causing a blank character to be written into the memory means at the location storing the replica of the character which is to be printed at the optioned print position.

Signed and sealed this 20th day of February 1973.

(SEAL)
Attest:

EDWARD M.FLETCHER,JR.
Attesting Officer

ROBERT GOTTSCHALK
Commissioner of Patents